Feb. 9, 1960 W. R. DRESSER 2,924,462

MAGNETIC TAPE

Filed May 1, 1953

INVENTOR.
WILLIS ROBERT DRESSER

BY

Emery, Varney, Whittemore & Dix

ATTORNEYS

United States Patent Office 2,924,462

Patented Feb. 9, 1960

2,924,462

MAGNETIC TAPE

Willis Robert Dresser, Long Hill, Conn., assignor, by mesne assignments, to The Prudential Insurance Company of America, a corporation of New Jersey Application May 1, 1953, Serial No. 352,543

1 Claim. (Cl. 274—41.4)

This invention relates to magnetic tape, i.e. a tape or strip carrying magnetizable material on which a magnetic record may be impressed. The invention pertains particularly to that form of magnetic tape in which motion picture film having the usual rows of sprocket holes along its margins is used as the tape and in which the magnetizable material is in the form of a plurality of spaced, parallel stripes extending longitudinally thereof.

In the manufacture of such tape, it has been found necessary to observe certain dimensional requirements, as, for example, that the width of the stripes be of the order of .050" for good sound recording and reproduction. Also, the spacing between adjacent stripes has had to be of the order of .075" to accommodate the plural sound heads used in recording and reproducing, as shown in Patents Nos. 2,640,886 and 2,637,785. The first of these patents shows an example of the simultaneous reproduction of sound signals from different tracks on a sound record tape, and the second shows how different reproducing heads are located side by side in a line transverse of the tape, and at right angles to the length of the tape, for reproducing such parallel sound tracks. Since economy requires that motion picture film be used in the standard sizes commonly manufactured, the number of stripes which could be placed on a film has been limited. For example, in using standard 35 mm. (1.378") film having two parallel rows of sprocket holes near the respective margins of the film, the clear space between the rows of sprocket holes which is available for magnetic stripes is slightly less than 1.000" in width. In fact, taking into consideration the fact that there must be a slight space between the outside margins of the outside stripes and the inside margins of the rows of sprocket holes, the space actually available for magnetic stripes does not exceed .875" in width. In striping such films, therefore, it has been assumed that the maximum number of strips which could be accommodated would be seven, for seven stripes each having a width of .050" would occupy .350" and six intervening spaces each having a width of .075" would occupy a width of .450", for a total of .800".

It is an object of the present invention to provide a tape in which the available space is utilized more efficiently so that the tape may carry an increased number of useable stripes.

Other objects and advantages of the invention will appear hereinafter.

A preferred embodiment of the invention selected for purposes of illustration is shown in the accompanying drawings, in which, Figure 1 is an enlarged plan view of a standard 35 mm. film striped in accordance with usual practice.

Figures 1, 2, 3:
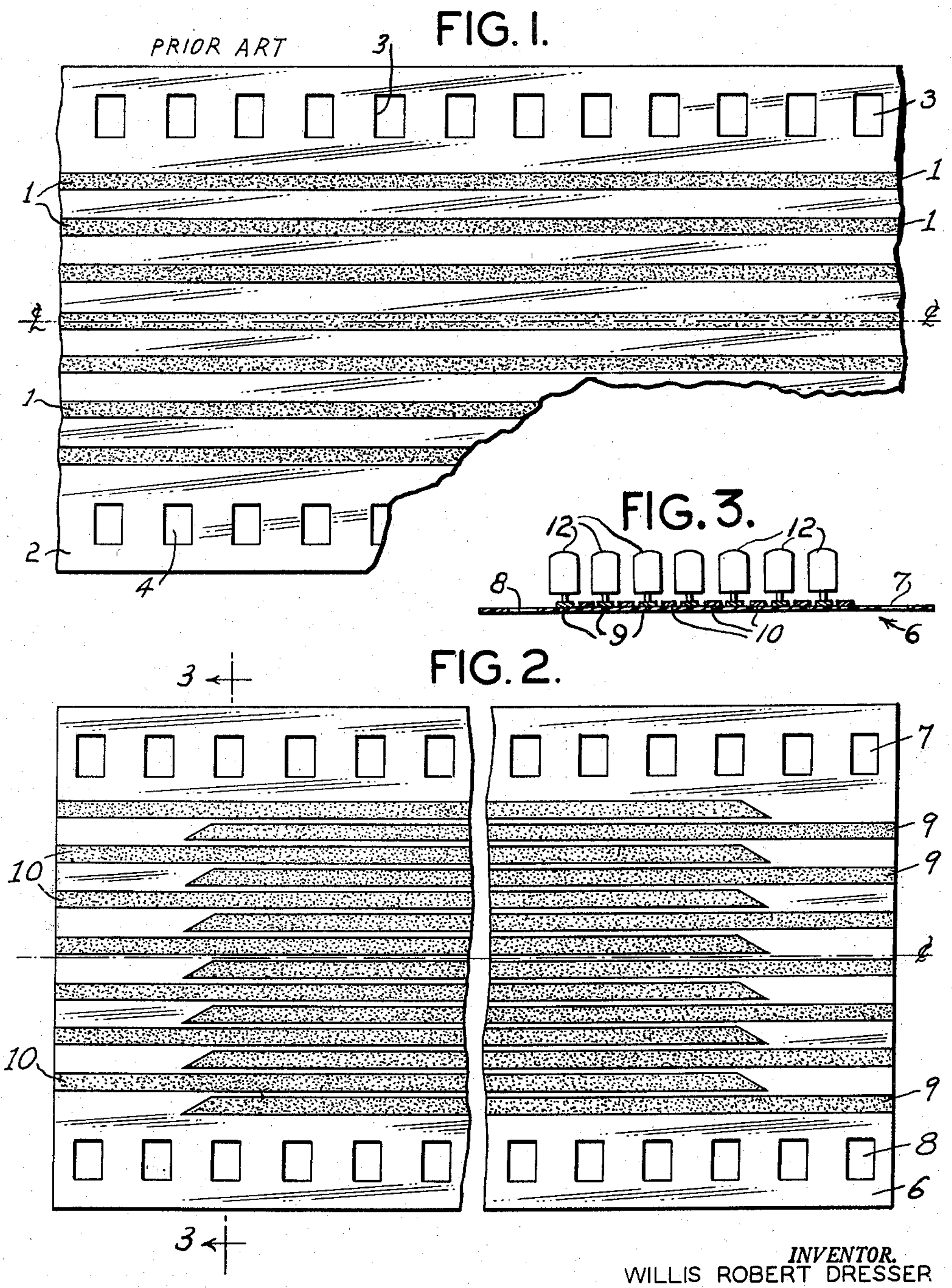
Figure 2 is a similar view of a similar film striped in accordance with the present invention.
Figure 3 is a transverse sectional view, on a reduced scale, through the film shown in Figure 2 and illustrating the way it is used with conventional reproducing heads.

Referring to the drawings, the usual arrangement of magnetic stripes is shown in Figure 1, in which the seven stripes 1 are arranged in spaced relationship on the film 2. The stripes may be of any suitable magnetic composition, applied in any convenient manner known in the art. Preferably the magnetic composition comprises iron oxide powder mixed with a plastic carrier which will adhere to the film surface and reduced to flowable state by the addition of plasticizer and solvent so that it may be flowed or spread on the film by a suitable applicator.

The film illustrated is a standard 35 mm. film having the usual parallel rows of sprocket holes 3, 4 and the stripes of .050" width are spaced .075" apart. As previously computed, the width of the striped area is .800", so that the outside margins of the outside stripes are adequately spaced from the inside margins of the rows of sprocket holes. The stripes are evenly spaced and arranged symmetrically on the film, i.e. with the center stripe bisected by the center line of the film and the outside stripes equally spaced from the inside margins of the rows of sprocket holes.

Figure 2 illustrates a novel arrangement of stripes according to the present invention. As shown therein, the film 6, having rows of sprocket holes 7, 8 therein is provided with one series of seven stripes 9 extending in one direction along the film and a second series of seven stripes 10 extending in the opposite direction and interlaced therebetween. This is made possible by arranging the respective series of stripes unsymmetrically on the film, although the entire group of fourteen stripes is symmetrically arranged. Thus, the series of stripes 9 is offset in one direction from the center line of the film while the series of stripes 10 is offset in the opposite direction.

The stripes of series 9 are spaced .075" apart as in the ordinary arrangement and can accommodate the required sound heads in the usual manner while the film is moved in one direction, say from left to right during either a recording or reproducing operation. When the film has reached the end of its travel, it may be shifted laterally, or alternatively the sound heads may be shifted laterally, to register with the stripes of series 10. Simultaneously, the direction of movement of the film may be reversed, so that the recording or reproducing operation may be continued. The lateral shifting of the film and reversal of the direction of movement may be accomplished so rapidly that there is no perceptible interruption in a recording of reproducing operation. By thus arranging the series of stripes, however, it is possible to reduce the length of the film by one half.

Figure 3 shows the film 6 with the series or group of magnetic sound stripes 9 and the second series or group of magnetic sound stripes 10. A row of convention reproducing heads 12 are located side-by-side in a row extending transversely across the film 6 and with one head 12 in contact with each of the stripes 9. By shifting the heads or the film transversely for a distance equal to one-half the center line spacing of the stripes 9, the heads will be in position to reproduce the sound signals on the stripes 10.

It will be understood that the invention may be variously modified and embodied within the scope of the subjoined claim.

I claim as my invention:

Sound reproducing apparatus including a magnetic tape comprising an elongated strip, stripes of magnetizable material including a plurality of parallel stripes extending lengthwise of the tape, alternate stripes being spaced from one another to register with a plurality of reproducing heads spaced transversely of the tape and located over and adjacent to said alternate stripes of the tape, with each of the heads in position to reproduce sound signals from its adjacent stripe as the tape moves longitudinally past the heads, each of said alternate stripes being magnetized and having variations in magnetism, the sequence of variations in magnetism in one direction lengthwise of the tape corresponding to sound signals, and the magnetism variations of each of said alternate stripes being correlated with the variations of the other of said alternate stripes to reproduce sound signals that supplement one another when simultaneously reproduced, and the stripes on the tape between said alternate stripes being magnetized similarly to said alternate stripes but with the sequence of variations in the magnetism that correspond to sound signals extending in the opposite directions lengthwise of the tape from those of said alternate stripes, the spacing from one another of these stripes which are located between said alternate stripes being the same as the spacing of said alternate stripes from one another, whereby the same reproducing heads can be used for reproducing sound signals from the stripes between said alternate stripes by shifting the tape and heads transversely with respect to one another for a distance equal to only the center line spacing of adjacent stripes of the tape, whereby the same reproducing heads can be used for the stripes of the second series by shifting the film and heads transversely with respect to one another, the first series of stripes having sound signals recorded thereon in a sequence extending in one direction lengthwise of the tape and the second series having sound signals recorded thereon with the sequence in the opposite direction, and different stripes of the second series also having sound signals that supplement one another for simultaneous reproduction.

References Cited in the file of this patent

UNITED STATES PATENTS

| | | |
|---|---|---|
| 2,299,738 | Collins | Oct. 27, 1942 |
| 2,468,198 | Heller | Apr. 26, 1949 |
| 2,541,136 | Warren | Feb. 13, 1951 |
| 2,561,338 | Camras | July 24, 1951 |
| 2,637,785 | Charlin | May 5, 1953 |
| 2,670,212 | Heller et al. | Feb. 23, 1954 |